US011001030B2

(12) United States Patent
Yoshikawa

(10) Patent No.: US 11,001,030 B2
(45) Date of Patent: May 11, 2021

(54) LAYERED BODY AND METHOD FOR PRODUCING SAME

(71) Applicant: Midori Auto Leather Co., Ltd., Yamagata (JP)

(72) Inventor: Yukari Yoshikawa, Tokyo (JP)

(73) Assignee: Midori Auto Leather Co., Ltd., Yamagata (JP)

( * ) Notice: Subject to any disclaimer, the term of this patent is extended or adjusted under 35 U.S.C. 154(b) by 0 days.

(21) Appl. No.: 16/462,925

(22) PCT Filed: Nov. 10, 2017

(86) PCT No.: PCT/JP2017/040524
§ 371 (c)(1),
(2) Date: May 21, 2019

(87) PCT Pub. No.: WO2018/096944
PCT Pub. Date: May 31, 2018

(65) Prior Publication Data
US 2019/0322072 A1 Oct. 24, 2019

(30) Foreign Application Priority Data
Nov. 22, 2016 (JP) ............................. JP2016-227009

(51) Int. Cl.
*B32B 3/26* (2006.01)
*B32B 7/09* (2019.01)
(Continued)

(52) U.S. Cl.
CPC ................ *B32B 3/263* (2013.01); *B32B 3/26* (2013.01); *B32B 3/28* (2013.01); *B32B 3/30* (2013.01);
(Continued)

(58) Field of Classification Search
CPC ........... B32B 3/263; B32B 3/266; B32B 3/28; B32B 3/26; B32B 3/30; B32B 7/09;
(Continued)

(56) References Cited

U.S. PATENT DOCUMENTS

2003/0134094 A1* 7/2003 Zafiroglu .................. B32B 3/28
428/198
2007/0120399 A1* 5/2007 Bajic .................... B60N 2/5635
297/180.11
(Continued)

FOREIGN PATENT DOCUMENTS

CN 101128140 A 2/2008
CN 104718106 A 6/2015
(Continued)

OTHER PUBLICATIONS

An Office Action mailed by China National Intellectual Property Administration dated Jul. 1, 2020, which corresponds to Chinese Patent Application No. 201780071637.1 and is related to U.S. Appl. No. 161462,925 with English language translation.
(Continued)

*Primary Examiner* — Jasper Saberi
(74) *Attorney, Agent, or Firm* — Studebaker & Brackett PC

(57) ABSTRACT

A layered body includes a cover or skin layer, a cushion layer 82, and an adhesive layer. The skin layer is made from a cover or skin material. The cushion layer is made from a cushioning material. The adhesive layer is made from an adhesive and provided between the skin layer and the cushion layer. A portion of the skin layer located between valleys of the cushion layer and corresponding to a bottom portion of a concave portion has positive curvature in the side view. The bottom portion of the concave portion between the valleys in a surface of the cushioning layer on which the adhesive layer is provided has negative curvature or is flat in the side view.

4 Claims, 6 Drawing Sheets

(51) Int. Cl.
  *B32B 5/02* (2006.01)
  *B32B 5/18* (2006.01)
  *B32B 7/12* (2006.01)
  *B32B 7/05* (2019.01)
  *B32B 3/28* (2006.01)
  *B32B 3/30* (2006.01)
  *B60N 2/58* (2006.01)

(52) U.S. Cl.
  CPC ............... *B32B 5/022* (2013.01); *B32B 5/18* (2013.01); *B32B 7/05* (2019.01); *B32B 7/09* (2019.01); *B32B 7/12* (2013.01); *B60N 2/58* (2013.01); *B32B 2601/00* (2013.01); *B32B 2605/003* (2013.01); *B60N 2/5891* (2013.01)

(58) Field of Classification Search
  CPC ....... B32B 7/12; B32B 5/18; B32B 2605/003; B32B 7/05; B60N 2/5891; B60N 2/58
  See application file for complete search history.

(56) References Cited

U.S. PATENT DOCUMENTS

| | | | |
|---|---|---|---|
| 2008/0284231 | A1 | 11/2008 | Takei et al. |
| 2016/0137112 | A1* | 5/2016 | Tabata ................. B60N 2/5825 297/452.38 |
| 2019/0232831 | A1 | 8/2019 | Shimizu |

FOREIGN PATENT DOCUMENTS

| | | |
|---|---|---|
| CN | 105392667 A | 3/2016 |
| JP | H03-7436 Y2 | 2/1991 |
| JP | H07-23665 A | 1/1995 |
| JP | 3037948 B1 | 5/2000 |
| JP | 2000-158573 A | 6/2000 |
| JP | 2012-192622 A | 10/2012 |
| JP | 2012-210776 A | 11/2012 |

OTHER PUBLICATIONS

International Search Report issued in PCT/JP2017/040524; dated Jan. 23, 2018.

* cited by examiner

LAYERED BODY AND METHOD FOR PRODUCING SAME

CROSS-REFERENCE TO RELATED APPLICATION

This application is based upon and claims the benefit of priority from Japanese Patent Application No. 2016-227009 filed to the Japan Patent Office on Nov. 22, 2016, the entire disclosure of which is incorporated herein by reference.

TECHNICAL FIELD

The present disclosure relates to a layered body and a method for producing the layered body.

BACKGROUND ART

In recent years, decorated products have been used in fields such as the automotive industry and the clothing industry.

As one of decoration methods, quilting plays an important role for displaying a three-dimensional effect, and especially for adding commercial value by enhancing designability of vehicle interior components, furniture or the like. For example, a prior art for producing vehicle seats with leather is as follows. First, leather (cow leather, or the like) tanned with chrome is prepared as a cover or skin material. The skin material is bonded to a cushioning material such as urethane foam with a thermoplastic adhesive sheet, or the skin material and the cushioning material are layered each other and sewed therearound. Then, the materials are sewed by a sewing machine in accordance with created designs. The cushioning material in the sewn portions is compressed and becomes thinner so that concave portions are formed. On the other hand, a portion surrounded by the sewn portions becomes a convex portion which has a three-dimensional effect since thickness of the cushioning material does not change in the surrounded portion. Diamond patterns or border patterns are often used as the three-dimensional designs.

For example, Patent Literature 1 (JP3037948B) discloses a method for making quilting using an adhesive. The method uses woven fabric, nonwoven fabric, leather, artificial leather, paper, or the like (a skin material), and a cushion (a cushioning material) such as urethane, sponge, synthetic cotton, palm lock as an intermediate layer which is disposed on the skin materials. An adhesive is injected from a bottom surface or an upper surface and cured by ultrasonic waves or high-frequency waves while the injected portion is compressed. Thereby, the upper layer, the intermediate layer and the bottom layer are bonded each other to form a concave portion. The quilting is made by performing the above process once or by continuously repeating the process.

Patent Literature 2 (JPH03-7436Y2) discloses waterproof quilt-like synthetic leather. In the synthetic leather, threads are arranged on a knitted surface in the form of seams using heat-shrink threads, and a urethane film is integrally coated on the knitted surface. In the coating film, concave portions are formed on the lines of the seams and stitch patterns are formed.

SUMMARY

However, in the case where the skin material is bonded to the cushioning material and then sewn together as described above, the skin material is folded along the stitches to generate corners. As a result, soft design finish cannot be displayed. This problem has not been recognized before.

The methods disclosed in Patent Literatures 1, 2 have been proposed as methods for making quilting in which the stitches do not appear on the upper surface of the skin material although Patent Literatures 1, 2 do not raise the above problem as a problem to be solved.

However, the methods disclosed in Patent Literatures 1, 2 have following problems and the methods are the same as the prior art in that either of the methods cannot display softness in terms of their designs.

Specifically, in the method for making the quilting disclosed in Patent Literature 1, the upper layer or the bottom layer is bonded to the intermediate layer or the upper layer, or the bottom layer is disposed on the intermediate layer. Then, the adhesive is injected from the upper layer or the bottom layer and cured while the injected portion is pressed. However, after disposing the skin material on the cushioning material, the skin material is pressed by an ultrasonic bonding device with a flat tip to form narrow concave portions, so that corners are also generated between the portions pressed by the ultrasonic bonding device and surroundings around the portions.

Also, in the method disclosed in Patent Literature 2, the concave portions are formed when the thread shrinks by heating. The concave portions become narrow since a single stitch is used, so that corners are generated along the stitch, which is shown in FIG. 1 of Patent Literature 2.

Accordingly, in the prior art and the methods disclosed in Patent Literatures 1, 2, the corners are generated at the boundaries of the convex portions and concave portions, causing a problem which deteriorates the soft finish with regard to its design.

The present disclosure has been made considering the above problems, and an object of the present disclosure is to provide a layered body and a method for the layered body which can improve softness of the design finish with regard to the shape of the layered body.

An inventor of the present disclosure has found that the cause of the above problem lies in the conventional methods. The skin material is placed on the cushioning material and sewn them from the upper surface, so that the skin material and the cushioning material closely contact each other and the corners generated by pressing the cushioning material by sewing appear on the upper surface of the skin material. Therefore, the inventor has found that the skin material can have a smoothly curved upper surface and a shape with a soft and gentle design appearance if the skin material is disposed not to completely contact the cushioning material so that spaces are formed at the corners in both ends of each concave portion in the cushioning material. Considering the above, means to solve the problems are proposed as follows.

A layered body according to the present disclosure includes a cover or skin layer, a cushioning layer, and an adhesive layer. The skin layer is made from a cover or skin material. The cushioning layer is made from a cushioning material. The adhesive layer is made from an adhesive and provided between the skin layer and the cushioning layer. The cushioning layer includes a concave portion, and the concave portion of the cushioning layer includes a pair of valleys. The cushioning layer is folded at portions corresponding to the valleys to form corners. A portion between the pair of valleys is a bottom surface of the concave portion. A portion of the skin layer located between the pair of valleys and corresponding to a bottom portion of the concave portion has positive curvature in the side view. The bottom portion of the concave portion between the valleys in a surface of the cushioning layer on which the adhesive layer is provided has negative curvature or is flat in the side view. Thereby, spaces are formed between the valleys of the cushioning layer and the skin layer.

A method for producing a layered body according to the present disclosure including forming a convex portion, providing an adhesive layer, pressing a cover or skin layer, and reforming the convex portion. The forming, the providing, the pressing and the reforming are performed in the above order. A second surface of the skin layer has the positive curvature in the side view. A first surface of the cushioning layer has the negative curvature or is flat in the side view. In the step for forming the convex portion, the convex portion is formed on the first surface of the cushioning layer made from a cushioning material. In the step for providing the adhesive layer, the adhesive layer made from an adhesive is provided on the first surface of the skin layer made from a cover or skin material. In the step for pressing the skin layer, the skin layer is pressed to the first surface of the cushioning layer at a predetermined pressure. In the step for reforming the convex portion, the convex portion is reformed on the first surface of the cushioning layer by releasing the predetermined pressure to bulge the first surface of the cushioning layer by restoring force of the cushioning layer that is pressed.

DETAILED DESCRIPTION

Figure 1:
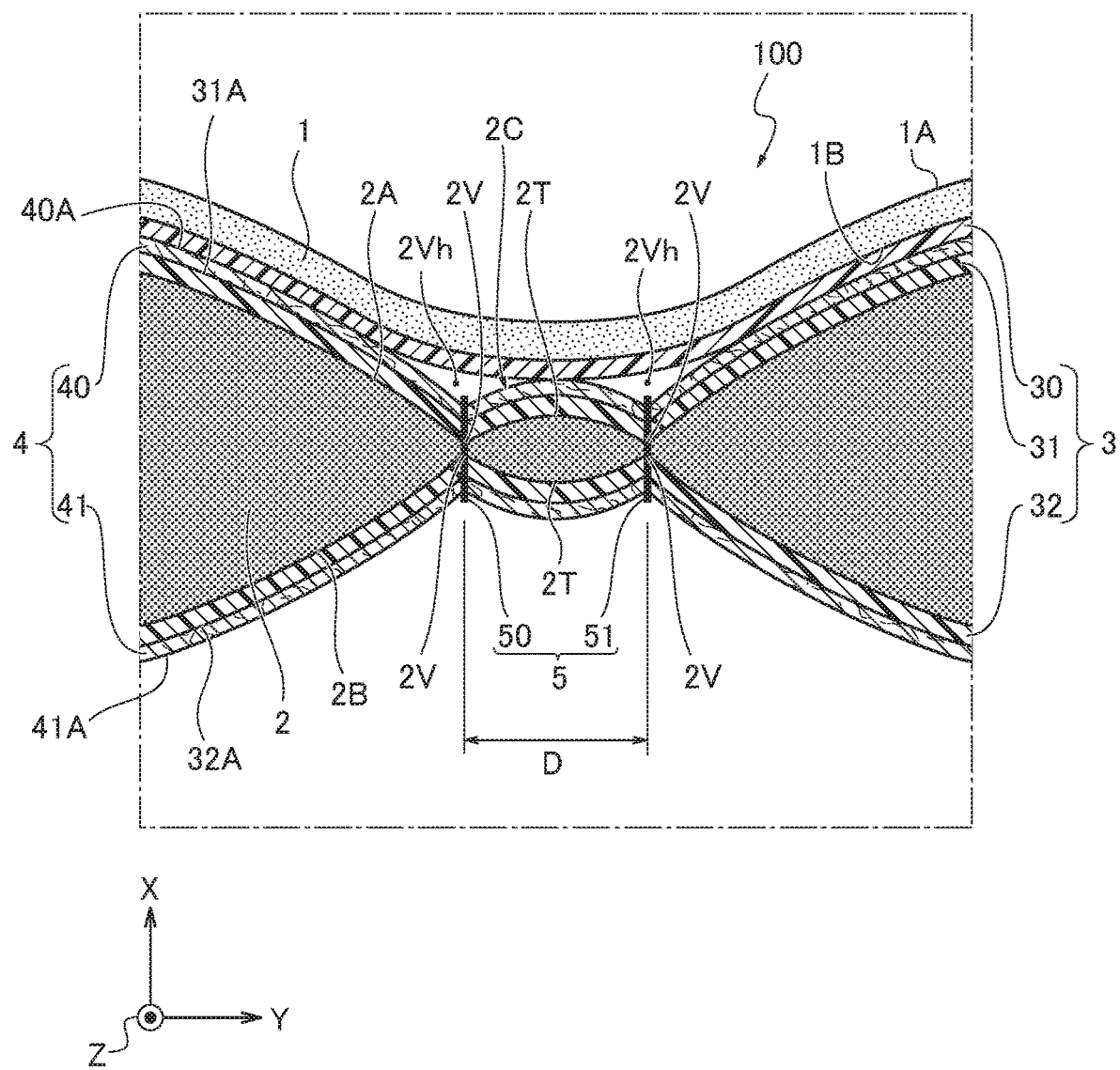
FIG. 1 is a side cross sectional view illustrating the schematic configuration of a layered body according to a First Embodiment and a Second Embodiment.

Hereinafter, preferred embodiments of a layered body and a method for producing the layered body according to the present disclosure will be described with reference to First to Third Embodiments shown in the drawings.

First Embodiment

First, the configuration will be described. A layered body according to the First Embodiment is applied to a vehicle interior component (a vehicle seat and the like, for example).

(Overall Configuration of Layered Body) FIG. 1 is a side cross sectional view illustrating the schematic configuration of the layered body according to the First Embodiment.

Hereinafter, the overall configuration of the layered body will be described with reference to FIG. 1.

The layered body 100 includes a cover or skin layer 1, a cushion layer 2, an adhesive layer 3, a porous layer 4, and a binding portion 5. The layered body 100 includes concave portions 2C formed by compressing the cushion layer 2 in an X direction, and valley 2V at each end of each concave portion 2C in the cushion layer 2.

The skin layer 1 is made from a cover or skin material (cow leather, for example). A convex portion 2T (bottom portion of the concave portion) is provided between a pair of valleys 2V of the cushion layer 2. A portion of the skin layer 1 corresponding to the convex portion 2T has the positive curvature in a side view.

The cushion layer 2 is made from a cushioning material (urethane foam, for example). The cushion layer 2 includes a surface 2A on which a second adhesive layer 31 is provided. The convex portion 2T of the cushion layer 2 between the valleys 2V has negative curvature in the side view. The cushion layer 2 includes a surface 2B on which a third adhesive layer 32 is provided. Similarly, the surface 2B of the convex portion 2T between the valleys 2V has the positive curvature in the side view. Spaces 2Vh are provided at locations corresponding to the valleys 2V of the cushion layer 2 between the surface 2A of the cushion layer 2 on which the second adhesive layer 31 is provided and a surface 1B of the skin layer 1 on which a first adhesive layer 30 is provided. Each of the spaces 2Vh has a substantially triangle shape in the side view. The spaces 2Vh function as passages for air flow in a Z direction.

The adhesive layer 3 is formed from an adhesive (a thermo plastic adhesive sheet, for example). The adhesive layer 3 includes the first adhesive layer 30, the second adhesive layer 31, and the third adhesive layer 32. The first adhesive layer 30 is provided between the skin layer 1 and a first porous layer 40. The second adhesive layer 31 is provided on the first surface 2A of the cushion layer 2. The second adhesive layer 31 is provided between the first porous layer 40 and the cushion layer 2 to bond the first porous layer 40 to the cushion layer 2. The third adhesive layer 32 is provided on the second surface 2B of the cushion layer 2. The third adhesive layer 32 is provided between a second porous layer 41 and the cushion layer 2 to bond the second porous layer 41 to the cushion layer 2.

The porous layer 4 (nonwoven fabric, for example) is configured to communicate the inside and the outside of the cushion layer 2. The porous layer 4 generates air flow in the Z direction. The porous layer 4 includes the first porous layer 40 and the second porous layer 41. The first porous layer 40 is provided on a surface 31A of the second adhesive layer 31, which is opposite to a surface on which the cushion layer 2 is provided. The second porous layer 41 is provided on a surface 32A of the third adhesive layer 32 opposite to a surface on which the cushion layer 2 is provided.

The binding portion 5 (a stitch, for example) binds the first porous layer 40, the second adhesive layer 31, the cushion layer 2, the third adhesive layer 32, and the second porous layer 41 together. The binding portion 5 includes a first binding portion 50 and a second binding portion 51. The first binding portion 50 and the second binding portion 51 are disposed separate from each other in the Y direction. A distance D between the portions is set to have a predetermined length (equal to or more than 5 mm, for example) necessary to display the design of the layered body 100. If the distance D is less than 5 mm, the softness of the design cannot be displayed since a fold line is formed in the center of the concave portion 2C. If the distance D is relatively longer (equal to or more than 15 mm, for example), the number of the stitches has to be increased since the center of the concave portion in the cushioning material bulges and accordingly the concave portion of the layered body becomes shallow.

(Experimental Example I) Next, the present disclosure will be specifically described with reference to the experimental example I. Here, an experimental result considering the designablity of the layered body 100 (See FIG. 1) according to this embodiment will be described. Note that the present disclosure is not limited to this experimental example. More specifically, the inventor conducted an experiment to evaluate the designablity of a test product (hereinafter referred to as a test product I) of the layered body 100 and a test product (hereinafter referred to as a test product II) of the conventional layered body 200 (See FIG. 4) by comparing the layered body 100, 200.

(Production of Test Product I) The inventor made the test product I for the lower part of the seat back and the rear part of the seat base of the vehicle seat. First, the genuine leather for the vehicle was provided as the skin layer 1 (See FIG. 1). The thickness of the vehicle genuine leather was 1.2±0.2 mm, and BLC (bending resistance) of the leather was 33.8. Thermoplastic adhesive sheets were provided as the first adhesive layer 30, the second adhesive layer 31, and the third adhesive layer 32. De-film urethane (t10, 0.03 g/cm$^3$) was provided as the first porous layer 40 and the second porous layer 41. Urethane foam (t2, 50 g, 0.022 g/cm$^3$) was provided as the cushion layer 2. Stitches for a computerized sewing machine (AMS-224EN-420 (product name), JUKI Corporation) were provided as the binding portion 5.

Next, the second adhesive layer 31 was disposed between the cushion layer 2 and the first porous layer 40, and the third adhesive layer 32 was disposed between the cushion layer 2 and the second porous layer 41. Then, the press process was performed to press a surface 40A of the first porous layer 40 (See FIG. 1) opposite to a surface on which the second adhesive layer 31 was provided, and a surface 41A of the second porous layer 41 opposite to a surface on which the third adhesive layer 32 was provided. The conditions for the press process were set to a temperature of 115° C., a pressure of 2000 kg/0.6 m$^2$, and a processing time of 10 seconds. In the press process, the cushion layer 2 and the first porous layer 40 were bonded by the second adhesive layer 31, and the cushion layer 2 and the second porous layer 41 were bonded by the third adhesive layer 32. Subsequently, in this experimental example, the test product I was made by performing a convex portion forming step, an adhesive layer providing step, and a pressing step in this order. The above steps will be described below.

(Convex Portion Forming Step) In the convex portion forming step, the quilting process was performed to the first porous layer 40, the second adhesive layer 31, the cushion layer 2, the third adhesive layer 32, and the second porous layer 41 to provide the first binding portion 50 and the second binding portion 51 by the computerized sewing machine. The convex portions 2T was formed on the first surface 2A and the second surface 2B of the cushion layer 2 by the quilting process. At this time, the distance between the first binding portion 50 and the second binding portion 51 (i.e. the distance D shown in FIG. 1) was set to at least equal to or more than 5 mm for the quilting process.

(Adhesive Layer Providing Step) In the adhesive layer providing step, the first adhesive layer 30 was provided between the skin layer 1 and the first porous layer 40 to which the quilting process was performed in the convex portion forming step. Thereby, the first adhesive layer 30 was provided to the second surface 1B (See FIG. 1) of the skin layer 1.

(Pressing Step) In the pressing step, the press process was performed to press a first surface 1A of the skin layer 1, which was provided with the first adhesive layer 30 on the second surface 1B in the adhesive layer providing step, toward the first surface 2A of the cushion layer 2 at a predetermined pressure. By the press process, the skin layer 1 and the first porous layer 40 were bonded each other via the first adhesive layer 30. The conditions for the press process were set to a temperature of 115° C., a pressure of 2000 kg/0.6 m$^2$, and a processing time of 30 seconds.

(Convex Portion Reforming Step) In the convex portion reforming step, the predetermined pressure (press pressure) in the press process of the pressing step was released, so that the first surface 2A of the cushion layer 2 bulged by the restoring force of the cushion layer 2 which had been pressed with the pressure, and accordingly the convex portion 2T was reformed on the first surface 2A of the cushion layer 2. As a result, the first surface 1A of the skin layer 1 has the positive curvature in the side view, and the first surface 2A of the cushion layer 2 has the negative curvature in the side view (See FIG. 1). The spaces 2Vh were formed when the release of the pressure expanded the surface 2A of the cushion layer 2 and moved the skin layer 1 away from the surface 2A of the cushion layer 2 in the valleys 2V on the surface 2A of the cushion layer 2.

Figure 2:
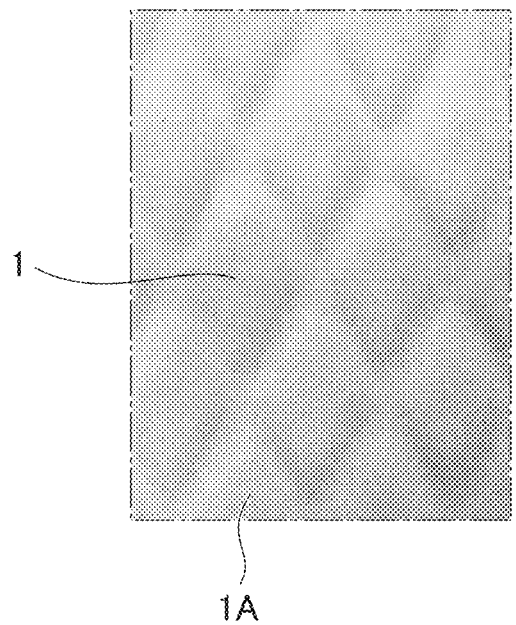
FIG. 2 is a photograph of a test product I taken from a skin layer 1 having diamond patterns, the test product I made by steps according to an experimental example in the First Embodiment.
Figure 3:
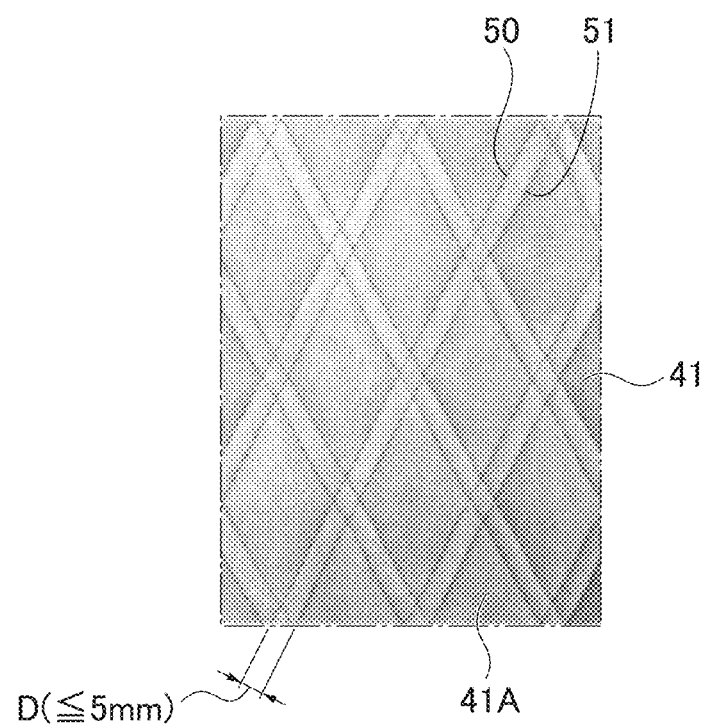
FIG. 3 is a photograph of the test product I taken from a second porous layer 41 having diamond patterns, the test product I made by steps according to the experimental example in the First Embodiment.

(Designablity of Test Product I) FIG. 2 is a photograph of the test product I taken from the skin layer 1, the test product I being made according to the above steps. FIG. 3 is a photograph of the test product I taken from the second porous layer 41, the test product I being made according to the above steps.

As shown in FIG. 3, the inventor successfully improved the designablity of the layered body 100 by setting the distance D between the first binding portion 50 and the second binding portion 51 equal to or more than a predetermined length (5 mm, for example) when performing the quilting process in the convex portion forming step. Specifically, the cross-sectional shape of the skin layer 1 can have a gently curved surface by forming the convex portion 2T on the first surface 2A of the cushion layer 2 in the convex portion forming step and then pressing the surface 1A of the skin layer 1 toward the first porous layer 40 to bond the skin layer 1 to the cushion layer 2 in the pressing step. As a result, the surface 1A of the skin layer 1 can have a soft and gentle design finish with regard to the shape of the diamond patterns as shown in FIG. 2.

Further, the test product I can improve the freedom of the relief expression on the skin layer 1 since only the cushion layer 2 is provided with the relief in the quilting process before bonding the skin layer 1 and the cushion layer 2, and then the skin layer 1 and the first porous layer 40 are bonded by the first adhesive layer 30.

Figure 4:
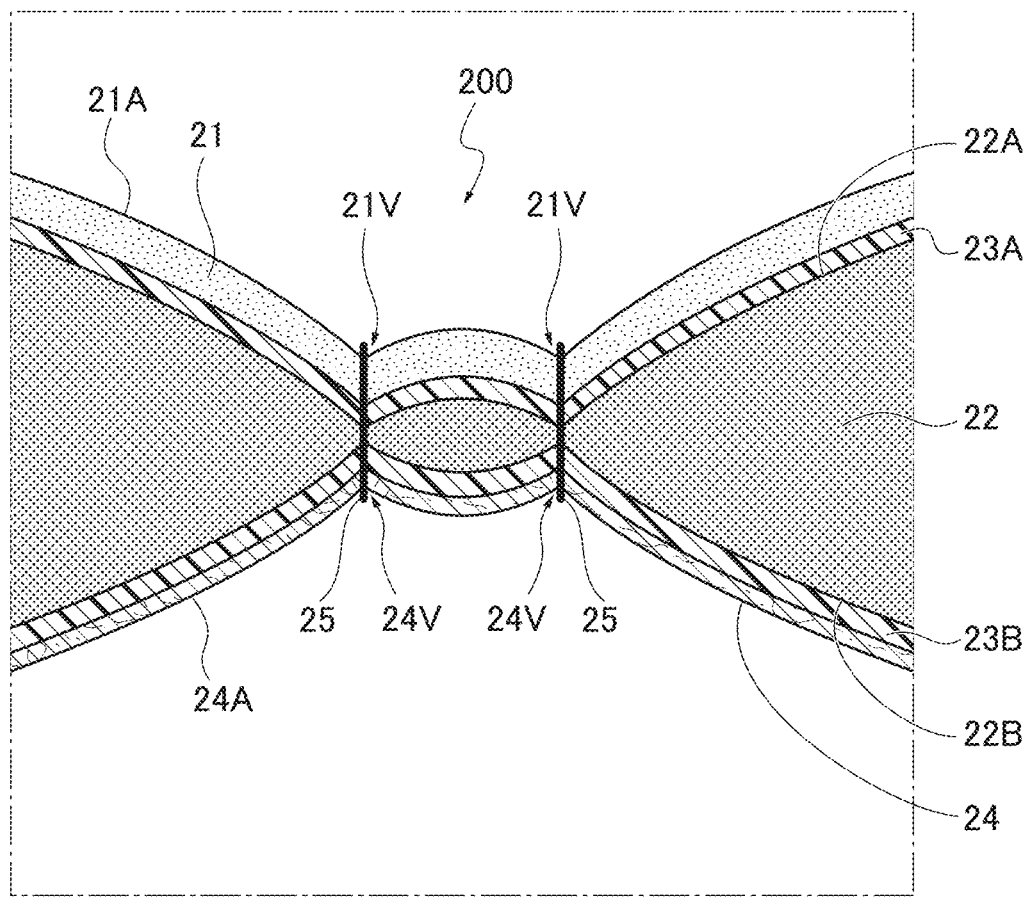
FIG. 4 is a side cross sectional view illustrating the schematic configuration of a test product II made by conventional steps according to an experimental example in the First Embodiment.
Figure 5:
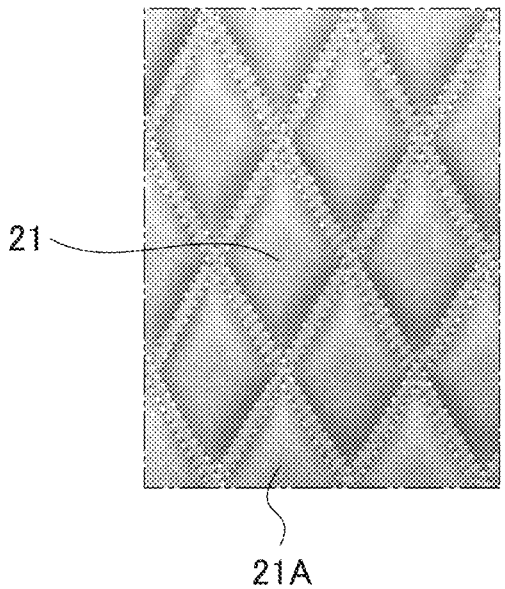
FIG. 5 is a photograph of the test product II taken from a skin layer 21 having diamond patterns, the test product II made by the conventional steps according to the experimental example in the First Embodiment.
Figure 6:
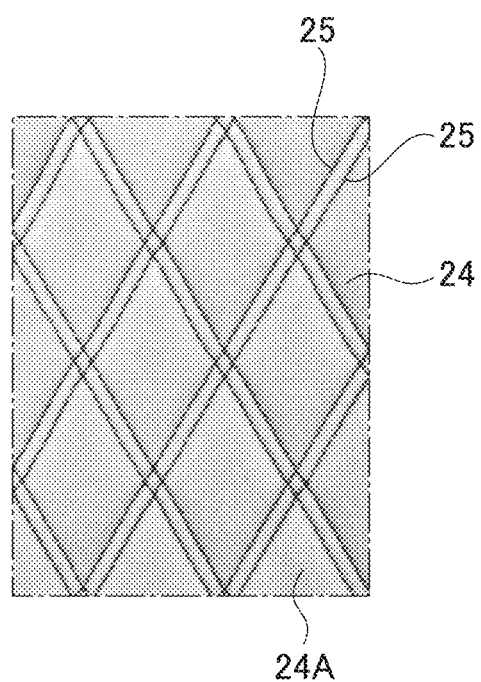
FIG. 6 is a photograph of the test product II taken from a nonwoven fabric 24 having diamond patterns, the test product II made by the conventional steps according to in the First Embodiment.

(Production of Test Product II) FIG. 4 is a side cross sectional view illustrating the schematic configuration of the test product II made by the conventional method. FIG. 5 is a photograph of the test product II taken from a skin layer 21 having diamond patterns, the test product II being made by the conventional steps. FIG. 6 is a photograph of the test product II taken from the nonwoven fabric 24 having diamond patterns, the test product II being made by the conventional steps.

The inventor made the test product II by the conventional method (See FIG. 4) for the lower part of the seat back and the rear part of the seat base of the vehicle seat. First, as shown in FIG. 4, the skin layer 21 was bonded to a first surface 22A of the urethane foam 22 by a first adhesive 23A. Then, the nonwoven fabric 24 was bonded to a second surface 22B of the urethane foam 22 by a second adhesive 23B. Next, the quilting process was performed to the skin layer 21, the first adhesive 23A, the urethane foam 22, the second adhesive 23B and the nonwoven fabric 24. Thereby, the skin layer 21, the first adhesive 23A, the urethane foam 22, the second adhesive 23B, and the nonwoven fabric 24 were bound by threads 25 and the test product II is made.

(Designability of Test Product II) In the layered body 200 of the test product II, a surface 21A of the skin layer 21 opposite to a surface on which the first adhesive 23A is provided has the negative curvature as shown in FIG. 4. Accordingly, corners are generated in the valleys 21V of the surface 21A as shown in FIG. 4. Similar to the surface 21A, in the layered body 200 of the test product II, a surface 24A of the nonwoven fabric 24 opposite to a surface on which the second adhesive 23B is provided has the positive curvature as shown in FIG. 4. Accordingly, similar to the valleys 21V, corners are also generated in the valleys 24V of the surface 24A as shown in FIG. 4.

As mentioned above, due to the corners generated in the surface 21A of the skin layer 21 and the corners generated in the surface 24A of the nonwoven fabric 24, the surface 21A of the skin layer 21 in the test product II loses a soft design finish with regard to the shape of the diamond patterns as shown in FIG. 5. Similarly, as shown in FIG. 6, the surface 24A of the nonwoven fabric 24 in the test product II cannot have a soft design finish with regard to the shape of the diamond patterns.

In the layered body 100 according to the First Embodiment, a portion of the skin layer 1 corresponding to the convex portion 2T between the two valleys 2V of the cushion layer 2 has the positive curvature in the side view. The convex portion 2T in the cushion layer 2 between the two valleys 2V of the surface 2A, on which the second adhesive layer 31 (i.e. the skin layer 1) is provided, has the negative curvature in the side view. Specifically, in the layered body 100 of the First Embodiment, the cushion layer 2 underneath the skin layer 1 is provided with the relief and then the skin layer 1 is bonded to the cushion layer 2 with the first adhesive layer 30. As a result, unlike the prior art, corners are not generated in the valleys of the relief on the surface 1A of the skin layer 1. Thereby, the cross-sectional of the skin layer 1 can have the gently curved surface. Accordingly, the surface 1A of the skin layer 1 have the soft design finish and the visual effect of the surface 1A improves when the layered body 100 is applied to the vehicle seat.

Second Embodiment

In the Second Embodiment, perforation process is performed on the skin layer 1 and the first adhesive layer 30.

First, the configuration will be described. A layered body according to the Second Embodiment is applied to a vehicle interior component (vehicle seat and the like) similar to the First Embodiment.

Figure 7:
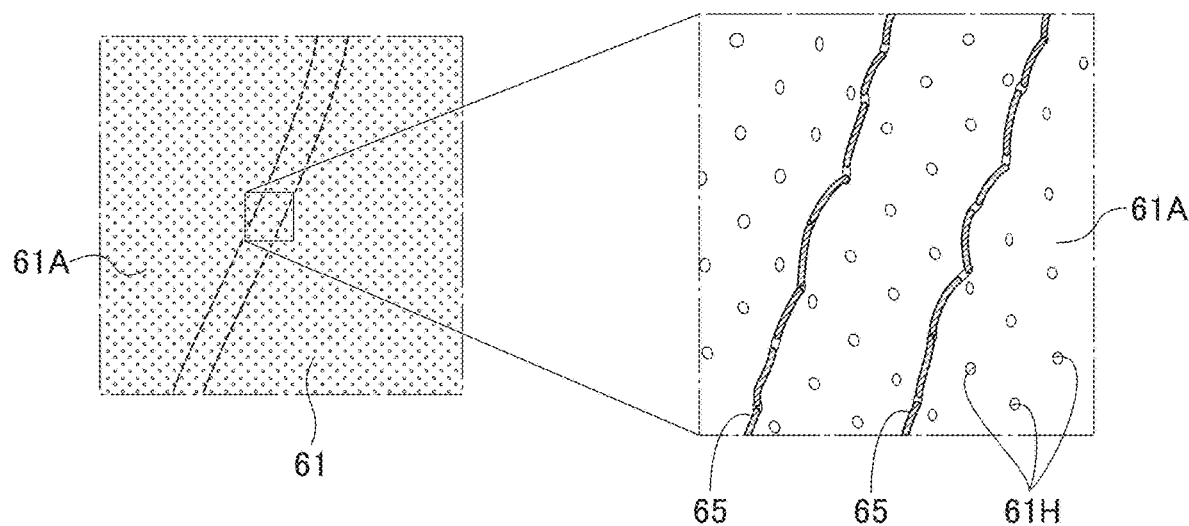
FIG. 7 is an explanatory view illustrating mechanism for deteriorating the quality of a layered body due to the perforation process, which is a comparative example to the layered body according to the Second Embodiment.

(Overall Configuration of Layered Body) FIG. 1 is a side cross sectional view illustrating the schematic configuration of the layered body according to the Second Embodiment. FIG. 7 illustrates the layered body according to the Second Embodiment seen from the skin layer 1. Hereinafter, overall configuration of the layered body will be described with reference to FIG. 1. Note that perforation holes are omitted in FIG. 1.

As shown in FIG. 1, the layered body 100 includes the skin layer 1, the cushion layer 2, the adhesive layer 3, the porous layer 4, and the binding portion 5. The adhesive layer 3 includes the first adhesive layer 30, the second adhesive layer 31, and the third adhesive layer 32.

The skin layer 1 and the first adhesive layer 30 include perforation holes which extend through the skin layer 1 and the first adhesive layer 30 in the X direction and communicate with the spaces 2Vh. Specifically, the perforation process is performed to the skin layer 1 in the Second Embodiment for the design of the skin material of the vehicle seat or for the ventilation of warm air and/or cold air from the seat to the vehicle interior depending on the perceived temperature or the room temperature when the vehicle includes an air conditioner. Note that other configurations are the same as the First Embodiment, so the same reference numerals are attached to the corresponding elements and descriptions thereof will be omitted.

Figure 8:
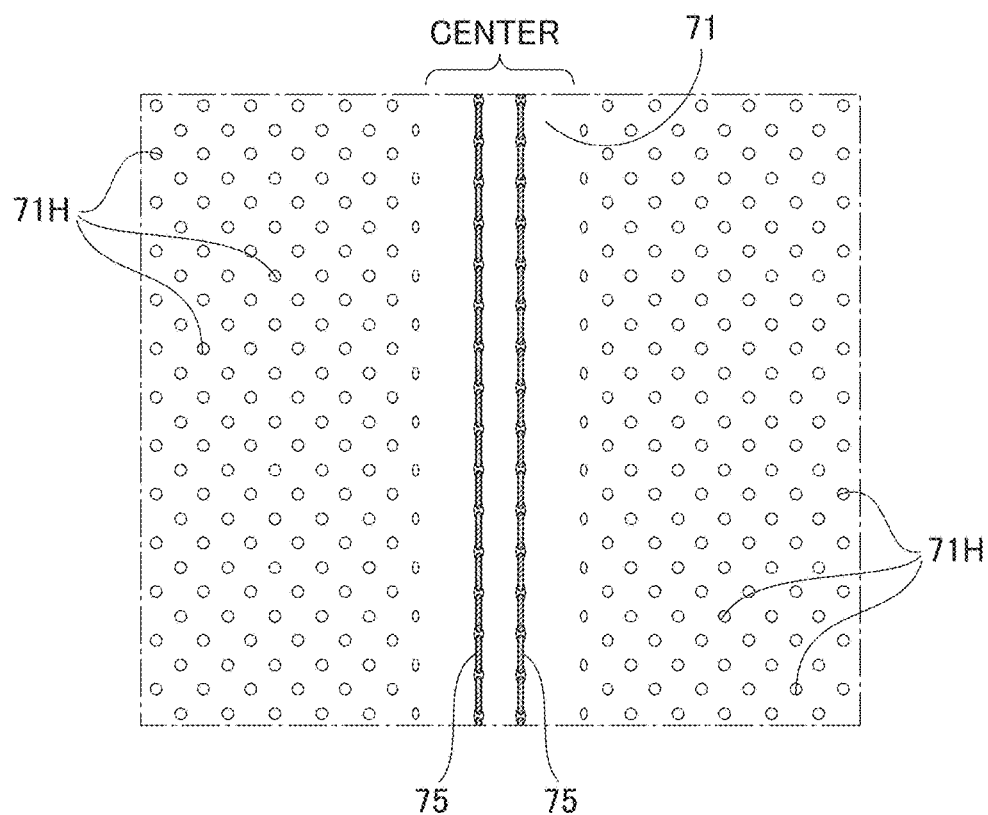
FIG. 8 is an explanatory view illustrating mechanism for reducing the productivity of the layered body due to the perforation process, which is the comparative example to the layered body according to the Second Embodiment.

(Mechanism for Quality Deterioration and Productivity Reduction Due to Perforation Process) FIG. 7 is an explanatory view illustrating mechanism for deteriorating quality of a layered body, which is a comparative example to the layered body of the Second Embodiment, due to the perforation process. FIG. 8 is an explanatory view illustrating mechanism for reducing the productivity of the layered body, which is a comparative example relative to the layered body of the Second Embodiment, due to the perforation process. With regard to a product to which the perforation process is performed, the quilting process may be performed to the product after the perforation process. Hereinafter, mechanisms for deteriorating the quality and productivity of the product will be described with reference to FIG. 7 and FIG. 8.

(Mechanism for Deteriorating Quality Due to Perforation Process) As shown in FIG. 7, after performing the perforation process to a surface 61A of a cover or skin material 61, the skin material 61 and a urethane foam layer (not shown) are bonded each other and then the quilting process is performed thereto. As shown in the partial enlarged view of FIG. 7, needle holes coincide with perforation holes 61H and accordingly stitches 65 have zigzag arrangements, causing a problem that the visual quality reduces.

(Mechanism for Receding Productivity Due to Perforation Process) To overcome the above problem, as shown in FIG. 8, adjustment is made in advance so that the perforation holes 71H do not open in the vicinity of the stitches 75 for the quilting process. Then the quilting process is performed to a punched skin material 71. However, it is difficult to accurately stitch in the center between the holes 71H. In addition, it takes time to perform such special perforation process, and accordingly, its productivity reduces.

On the other hand, in the layered body 100 of the Second Embodiment as shown in FIG. 1, the design with the relief expression can be formed by the skin layer 1 to which the perforation process is performed regardless of portions to which the quilting process is performed since the first binding portion 50 and the second binding portion 51 for the quilting process are provided below the skin layer 1.

Further, in the layered body 100 of the Second Embodiment, the skin layer 1 and the first adhesive layer 30 include the perforation holes which extend through the skin layer 1 and the first adhesive layer 30 in the X direction and communicate with the spaces 2Vh. Accordingly, the spaces 2Vh form air passages in the Z direction and the perforation holes form air passages in the X direction. As a result, the breathability of the layered body 100 can be further improved since the air passages in the X direction increase.

Third Embodiment

In the Third Embodiment, the cushion layer is formed by heat welding.

First, the configuration will be described. A layered body according to the Third Embodiment is applied to a vehicle interior component (a vehicle seat and the like) similar to the First Embodiment.

Figure 9:
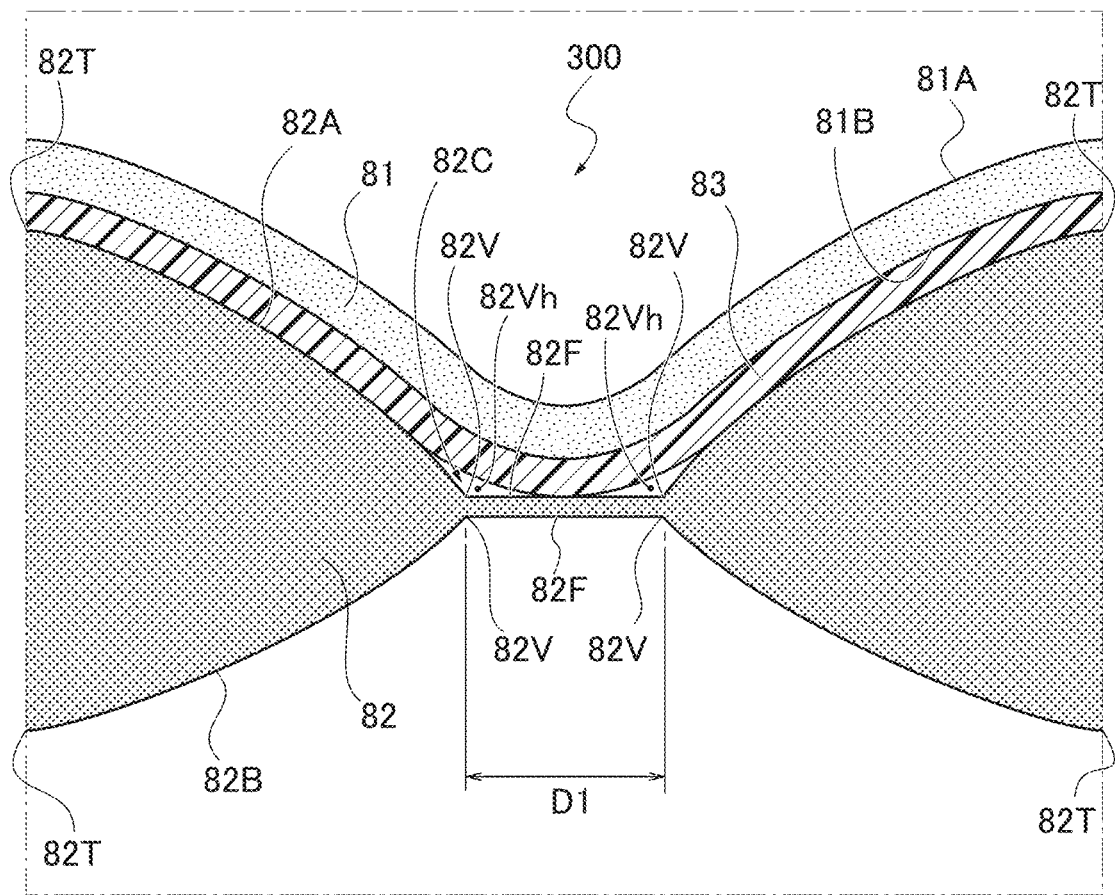
FIG. 9 is a side cross sectional view illustrating the schematic configuration of the layered body according to a Third Embodiment.

(Overall Configuration of Layered Body) FIG. 9 is a side cross sectional view illustrating the schematic configuration of the layered body according to the Third Embodiment. Hereinafter, the overall configuration of the layered body will be described with reference to FIG. 9.

As shown in FIG. 9, the layered body 300 includes a skin layer 81, a cushion layer 82, and an adhesive layer 83. The layered body 300 includes concave portions 82C and valleys 82V. The concave portions 82C are formed by compressing the cushion layer 82 in the X direction. The valley 82V is formed at each end of each concave portion 82C in the cushion layer 82.

The skin layer 81 is made from a cover or skin material (cow leather, for example). A flat section 82F (bottom portion of the concave portion) is provided between the valleys 82V of the cushion layer 82. A portion of the skin layer 81 corresponding to the flat section 82F has the positive curvature in a side view.

The cushion layer 82 is made from a cushioning material (urethane foam, for example). The cushion layer 82 includes a surface 82A on which the adhesive layer 83 is provided. The flat section 82F between the valleys 82V of the surface 82A is flat in the side view. The cushion layer 82 also includes a surface 82B opposite to the surface 82A on which the adhesive layer 83 is provided. Similarly, the flat section 82F between the valleys 82V of the surface 82B is flat in the side view. The pair of valleys 82V is provided spaced away from each other in the Y direction. A distance D1 between the valleys is set to have a predetermined length (equal to or more than 5 mm, for example) necessary to display the design of the layered body 300. Spaces 82Vh are provided at locations corresponding to the valleys 82V of the cushion layer 82 between the surface 82A of the cushion layer 82 on which the adhesive layer 83 is provided and a surface 81B of the skin layer 81 on which the adhesive layer 83 is provided. Each of the spaces 82Vh has a substantially triangle shape in the side view. The spaces 82Vh function as passages for air flow in the Z direction.

In the Third Embodiment, the cushion layer 82 is formed by heat welding. The heat welding is performed by welding process to the cushion layer 82.

The adhesive layer 83 is made from an adhesive (thermoplastic adhesive sheet, for example). The adhesive layer 83 is provided between the skin layer 81 and the cushion layer 82 to bond the skin layer 81 to the cushion layer 82.

(Experimental Example II) Next, the present disclosure will be described with reference to an experimental example II. Here, an experimental result considering the designablity of the layered body 300 (See FIG. 9) according to this embodiment will be described. Note that the present disclosure is not limited to this experimental example. More specifically, the inventor conducted an experiment to evaluate the designablity of the test product II and a test product (hereinafter referred to as a test product III) of the layered body 300 by comparing the test products II, III.

(Production of Test Product III) The inventor made the test product III for the lower part of the seat back and the rear part of the seat base of the vehicle seat. First, genuine leather for the vehicle was provided for the skin layer 81 (See FIG. 9). The thickness of the vehicle genuine leather was 1.2±0.2 mm, and BLC (bending resistance) of the leather was 33.8. The thermoplastic adhesive sheet was provided for the adhesive layer 83. Urethane foam (t2, 50 g, 0.022 g/cm$^3$) was provided for the cushion layer 8.

Subsequently, in this experimental example, the test product III was made by performing a convex portion forming step, an adhesive layer providing step, and a pressing step in this order.

(Convex Portion Forming Step) In the convex portion forming step, the welding process was performed to the cushion layer 82. As the conditions for the welding process, the current was set to 0.35 A, the welding time was set to 3.0 seconds, the cooling time was set to 3.0 seconds, and the mold temperature was set to 90° C. The cushion layer 82 was formed and convex portions 82T were formed on the surface 82A and the surface 82B of the cushion layer 82 by the welding process. At this time, the distance between the valleys 82V (i.e. the distance D1 shown in FIG. 9) was set to at least equal to or more than 5 mm for the welding process.

(Adhesive Layer Providing Step) In the adhesive layer providing step, the adhesive layer 83 was disposed between the cushion layer 82 and the skin layer 81 to which the welding process was performed in the convex portion forming step. Thereby, the adhesive layer 83 was provided on the second surface 81B of the skin layer 81 (See FIG. 9).

(Pressing Step) In the pressing step, the press process was performed to press a first surface 81A of the skin layer 81, which is provided with the adhesive layer 83 on the second surface 81B in the adhesive layer providing step, to the first surface 82A of the cushion layer 82 at a predetermined pressure. By the press process, the skin layer 81 and the cushion layer 82 were bonded each other with the adhesive layer 83. The conditions for the press process were set to temperature of 115° C., pressure of 2000 kg/0.6 m$^2$, and processing time of 30 seconds.

(Convex Portion Reforming Step) In the convex portion reforming step, the predetermined pressure (press pressure) in the press process of the pressing step was released, so that the first surface 82A of the cushion layer 82 bulged to form spaces 82Vh by the restoring force of the cushion layer 82 which had been pressed with the pressure and accordingly the convex portions 82T was reformed on the first surface 82A of the cushion layer 82. As a result, the first surface 81A of the skin layer 81 has the positive curvature in the side view, and the first surface 82A of the cushion layer 82 becomes flat (See FIG. 9).

(Designablity of Test Product III) The inventor successfully improved the designablity of the layered body 300 by setting the distance D1 between the valleys 82V to equal to or more than 5 mm when performing the quilting process in the convex portion forming step. Specifically, the cross-sectional of the skin layer 81 can have a gently curved surface by forming the convex portions 82T on the first surface 82A of the cushion layer 82 in the convex portion forming step and then pressing the surface 81A of the skin layer 81 toward the cushion layer 82 to bond the skin layer 81 to the cushion layer 82 in the pressing step. As a result, the surface 81A of the skin layer 81 can have a softer design finish with regard to the shape thereof compared to the test product II.

Further, the test product III can improve the freedom of the relief expression on the skin layer 81 compared to the test product II since only the cushion layer 82 is provided with the relief in the welding process before bonding the skin layer 81 and the cushion layer 82 and then the skin layer 81 is bonded to the cushion layer 82 with the adhesive layer 83.

Moreover, in the layered body 300 according to the Third Embodiment, the cushion layer 82 is formed by heat welding in the welding process, and the convex portions 82T are formed on the first surface 82A and the second surface 82B of the cushion layer 82. Accordingly, it is very advantageous in cost compared to forming the cushion layer 82 by sewing process, for example. Specifically, it is required to prepare a mold for foam molding according to the design of the cushion layer 82 when using the sewing process. However, the thermal welding is very advantageous in cost since it only requires preparing a mold for a portion of the cushion layer 82 to be recessed. Moreover, the thermal welding is not complicated and is very advantageous in cost compared to the formation by the cutting process.

The layered body and the method for producing the layered body according to the present disclosure have been described with reference to the First, Second, and Third Embodiments. However, the specific configurations are not limited to ones in these embodiments, and changes, additions, and the like may be made without departing from the scope of the inventions as recited in the claims.

In the First and Second Embodiments, the cushion layer 2 underneath the skin layer 1 is formed from the quilted urethane foam. However, the present disclosure is not limited to these embodiments. For example, the cushion layer 2 may be molded urethane foam (heat welding, foaming in molds, cutting, or the like). Alternatively, the cushion layer 2 may be quilted cotton. In this case, the layered body 100 may be decorated by cutting the urethane foam without performing the quilting process to the urethane foam as long as the hardness of the molded urethane foam can be maintained so as not to deform by cutting. In the case where the urethane foam is cut, the cushion layer 2 may not be provided with the first porous layer 40 which prevents the breakage or the like of the urethane foam when the urethane foam is sewn with stitches. Further, in the case where the layered body 100 is decorated by cutting the urethane foam even if the urethane foam is soft, the cushion layer 2 may not be provided with the first porous layer 40 which prevents the breakage or the like of the urethane foam.

The skin layer 1 is made of the cow leather in the First and Second Embodiments and the skin layer 81 is made of the cow leather in the Third Embodiment. However, the present disclosure is not limited to these embodiments. For example, the skin layer 1 or the skin layer 81 may be made of any one of genuine leather, synthetic leather, artificial leather, polyvinyl chloride (PVC) and cloth.

In the First and Second Embodiments, the porous layer 4 is made of non-woven cloth. However, the present disclosure is not limited to these embodiments. For example, the porous layer 4 may be made of mesh material. In short, the porous layer 4 may be made of a material which communicates between the inside and the outside of the cushion layer 2.

In the First and Second Embodiments, the skin layer 1 and the second porous layer 41 have the diamond patterns. However, the present disclosure is not limited to these embodiments. For example, the skin layer 1 and the second porous layer 41 may have straight border patterns or curved patterns. In short, the skin layer 1 and the second porous layer 41 may have other patterns as long as the layers have a soft design finish with regard to the shape thereof.

In the First, Second and Third Embodiments, the layered body and the method for producing the layered body according to the present disclosure are applied to the vehicle seats. However, the present disclosure is not limited to the above embodiments. The layered body and the method for producing the layered body according to the present disclosure may be applied to vehicle interior components such as an instrument panel, a door trim, or a seat back.

In the First, Second and Third Embodiments, the layered body and the method for producing the layered body according to the present disclosure are applied to the interior components for the vehicle such as an automobile. However, the layered body and the method for producing the layered body according to the present disclosure may be applied to interior components for vehicles other than the automobile (rail cars, pleasure boats, or the like, for example) or furniture (leather sofa, and the like, for example).

The distance D between the first binding portion 50 and the second binding portion 51 is set to equal to or more than 5 mm in the First Embodiment, and the distance D1 between the pair of the valleys 82V is set to equal to or more than 5 mm in the Third Embodiment. However, the present disclosure is not limited to the above. For example, the distance D, D1 may be set to less than 5 mm. In other words, each of the distances D, D1 may be set to any length necessary to display the design of the layered body 100, 300.

The invention claimed is:

1. A quilting material for a vehicle interior component comprising: a skin layer made from a skin material; a cushioning layer made from a cushioning material; adhesive layers made from an adhesive, wherein the adhesive layers comprise a first adhesive layer provided between the skin layer and the cushioning layer and a second adhesive layer; and a pair of porous layers comprising a first porous layer and a second porous layer that sandwiches the cushioning layer via the first adhesive layer provided between the first porous layer and the cushioning layer and the second adhesive layer provided between the second porous layer and the cushioning layer, wherein the cushioning layer comprises a concave portion, wherein the concave portion of the cushioning layer comprises a pair of valleys, wherein a portion of the skin layer located between the valleys and corresponding to a bottom portion of the concave portion has positive curvature in the side view, and wherein the bottom portion of the concave portion between the valleys in a surface of the cushioning layer on which the first adhesive layer is provided has negative curvature or is flat in the side view.

2. The quilting material according to claim 1, wherein each of the porous layers is a nonwoven fabric or a mesh material.

3. The quilting material according to claim 1, wherein the adhesive layers further comprise a third adhesive layer on a surface of the skin layer facing the cushioning layer, and wherein a space is provided in a portion corresponding to the valley of the cushioning layer in the side view between a surface of the skin layer on which the third adhesive layer is provided and a surface of the cushioning layer on which the first adhesive layer is provided.

4. A method for producing the quilting material of claim 1 comprising: forming a convex portion on a first surface of the cushioning layer made from a cushioning material; providing an adhesive layer made from an adhesive on a first surface of a skin layer made from a skin material; pressing the first surface of the skin layer to the first surface of the cushioning layer at a predetermined pressure; and reforming the convex portion on the first surface of the cushioning layer by releasing the predetermined pressure to bulge the first surface of the cushioning layer by restoring force of the cushioning layer that is pressed, wherein the forming, the providing, the pressing and the reforming are performed in the above order, and wherein a second surface of the skin layer has positive curvature in the side view, and the first surface of the cushioning layer has negative curvature or is flat in the side view.

\* \* \* \* \*